UNITED STATES PATENT OFFICE.

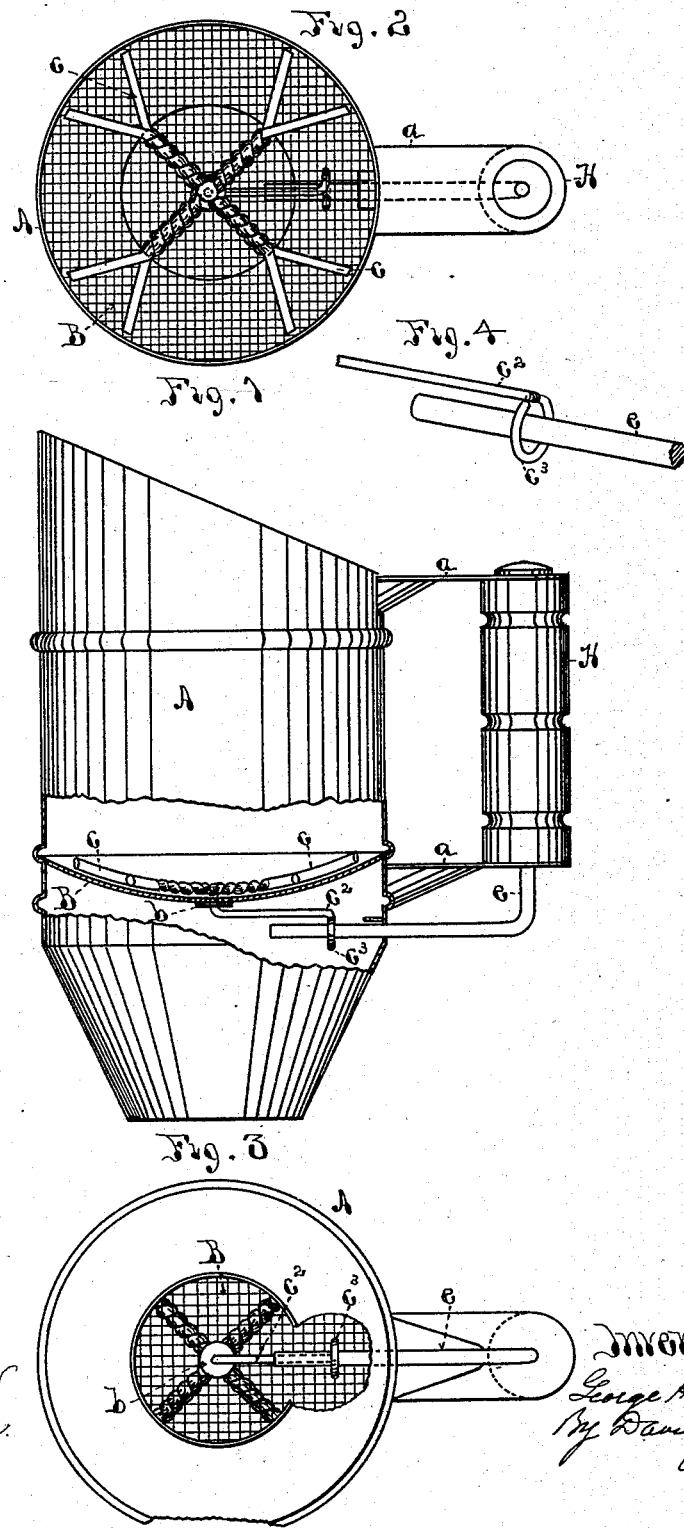

GEORGE H. PAINE, OF PHILADELPHIA, PENNSYLVANIA.

FLOUR-SIFTER.

SPECIFICATION forming part of Letters Patent No. 413,303, dated October 22, 1889.

Application filed July 11, 1889. Serial No. 317,202. (No model.)

*To all whom it may concern:*

Be it known that I, GEORGE H. PAINE, of Philadelphia, in the county of Philadelphia and State of Pennsylvania, have invented a new and useful Improvement in Flour-Sifters, of which the following is a specification.

My invention relates to sifters for flour and other purposes; and it consists in certain new and useful improvements thereof, substantially as hereinafter described and claimed.

In the drawings, Figure 1 is a side elevation of a sifter and scoop constructed according to my invention, with the side wall partly broken away and sectioned to show the internal mechanism. Fig. 2 is a top plan view of the same. Fig. 3 is a bottom plan view, partially broken away to show the operative mechanism. Fig. 4 is an enlarged detail showing the connection between the handle-arm and the arm of the sifting device.

A is the body of the scoop, made in the usual form and having its lower end funnel-shaped. Above the funnel-shaped portion of the scoop and within it is located the screen B, through which flour or meal is to be sifted, whence it passes downward through the funnel-shaped lower end of the sifter. The screen B has attached to its center a piece of metal $b$, which is perforated with a pivot-hole passing vertically through it. Pivoted in this hole is an agitator $c$, which consists of arms radiating outward toward the inner circumference of the scoop, formed of twisted wire and having the central pivot-arm $c^2$, bent at right angles underneath the screen toward the handle and terminating in a loop $c^3$, bent so as to present a horizontal opening in the direction of the handle. The agitator $c$ is arranged to turn on its central pivot in a plane parallel with and just above the screen B, so as to agitate the portion of the flour or meal lying next the screen and cause it to pass through the latter.

Brackets $a$ $a$ are attached to the side of the scoop, and in these the handle H is pivoted vertically on the wire axis $e$. This axis extends downward below the lower bracket $a$, and is there bent at right angles and passes through a slot in the side of the scoop below the screen B, and through the wire loop $c^3$ of the agitator-arm $c^2$, fitting loosely in the loop. The slot through which the bent part of the wire axis $e$ passes is broad enough horizontally to allow the handle to be turned in the brackets $a$ $a$, and thus vibrate the horizontally-bent end of its wire axis $e$ to and fro, carrying with it the outer end of the agitator-arm $c^2$ and turning the agitator $c$ horizontally as the handle H is turned. The meal or flour is thus sifted through the screen, leaving the coarser portions above it to be tipped out of the scoop when the sifting is done.

The handle H may be grasped in one hand, and by giving a vibratory motion to that hand the scoop itself will turn upon the handle back and forth, thereby partially revolving the agitator, as before described, and sifting the contents of the scoop very easily and to great advantage, because the bent arm $e$ of the handle acts upon the outer end of the bent arm $c^2$ of the agitator, and thereby gives a leverage over the latter, which enables the sifting to be done easily.

By having the lower end of the scoop funnel-shaped the agitating of the scoop upon the handle by the use of one hand, as described, is much more advantageously accomplished, because the lower and smaller end of the funnel delivers the sifted flour or meal into a much smaller dish than if the funnel shape were not applied to the lower end of the scoop below the screen. This is not only because the peculiar location and mode of operation of the pivoted handle H causes the whole scoop to vibrate to and fro sidewise above the dish into which the meal is sifted, moving upon the axis of the handle as a vertical vibratile pivot, but also because the vibrating arms $c^2$ $e$, striking the meal as it drops from the screen B, throw it off laterally, and the tapering faces of the downward extension serve to prevent this action from scattering the meal much more efficiently than any other form.

What I claim as new and of my invention is—

1. The combination of the scoop A, its horizontal screen B, the revolving agitator $c$, pivoted in the screen and provided with the horizontal arm $c^2$, the handle H, pivoted vertically in the brackets $a$ $a$ on the side of the scoop and having its horizontally-extended pivoted arm $e$ linked to the arm $c^2$, whereby the partial rotation of the handle in the brackets is made to partially rotate the agitator $c$, substantially as described.

2. The combination of the scoop A, provided with the tapering or contracted downward extension below its screen, the horizontal screen B, the rotary agitator $c$, arranged to vibrate above the screen and provided with the vibrating arm $c^2$, extending horizontally below the screen in the path of the material sifted through the same, the handle H, pivoted vertically in brackets on the side of the scoop and having its pivoted arm $e$ linked to arm $c^2$, whereby the tapering downward extension of the scoop incloses and prevents the scattering of the sifted material by said arms, substantially as described.

GEORGE H. PAINE.

Witnesses:
LOUISA LAIPPLE,
M. L. FOLEY.